Oct. 23, 1951     R. L. GALLAWAY     2,572,255
SEISMIC SURVEY SYSTEM FOR SUBMERGED AREAS
Filed Jan. 18, 1950
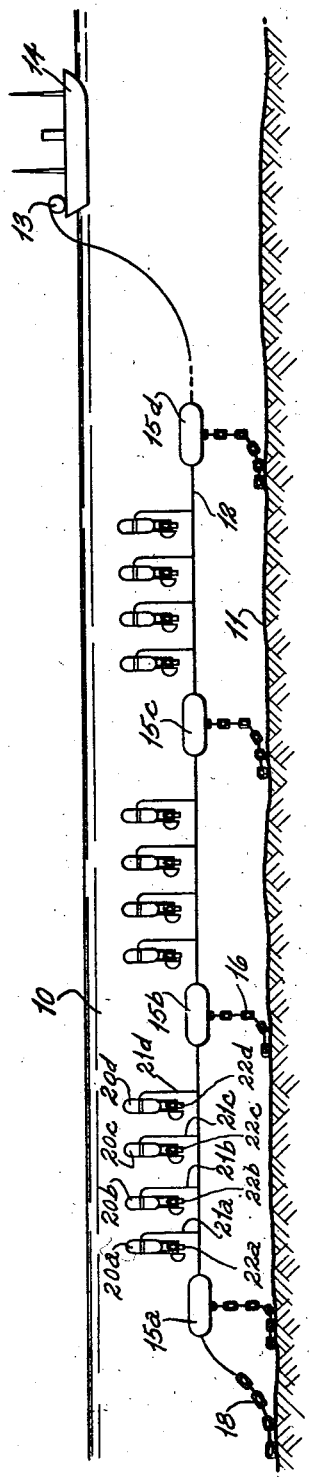
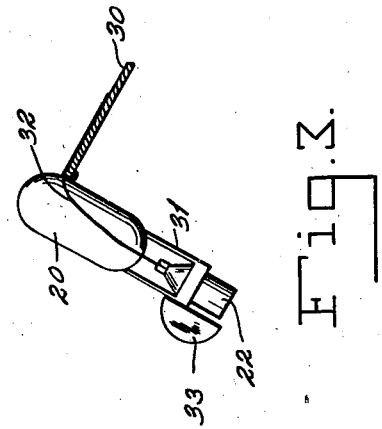
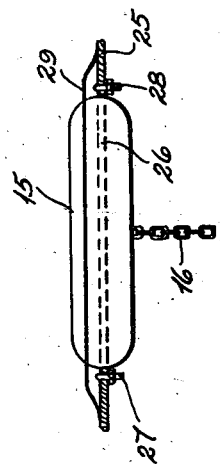
INVENTOR.
ROY LEE GALLAWAY
BY
ATTORNEYS Patented Oct. 23, 1951

2,572,255

UNITED STATES PATENT OFFICE 2,572,255

SEISMIC SURVEY SYSTEM FOR SUBMERGED AREAS

Roy Lee Gallaway, Laurel, Miss., assignor to The Texas Company, New York, N. Y., a corporation of Delaware Application January 18, 1950, Serial No. 139,248

4 Claims. (Cl. 177—352)

1

This invention relates to a seismic surveying system for submerged areas and more particularly to systems wherein a conductor cable having seismic detectors connected thereto is maintained at a predetermined level within the submerging medium, the conductor cable being in communication with receiving and recording instruments carried on a barge, vessel or other transporting means.

More specifically, the invention contemplates a semi-floating conductor cable adapted to be towed through the submerging medium having buoys spaced apart from each other and attached to the cable. A weighting chain is attached to each buoy, one end of the chain being free to drag upon the submerged surface, the weight of the chains being such as to maintain the cable and its buoys submerged at a predetermined and substantially uniform elevation above the submerged surface. Seismic detectors supported in submerged carriers or buoys are connected at spaced intervals and by non-rigid or flexible means to the conductor cable, each detector being in electrical communication with the conductor.

In prior practice, the conductor cable with attached seismometers has been dragged over the submerged surface and this dragging is frequently injurious to the cable and may also involve wrapping of the individual seismometer leads around the conductor cable with attendant difficulties as well as resultant adverse effects upon the quality of the recorded signals.

The present invention with its employment of a semi-floating cable system possesses a number of advantages. In the first place, the weight of the assembly is much less than that of the conventional cable and the pull required to move from one location to another is greatly reduced. A very important advantage is that the system permits use of multiple detectors as they are used on land, with resulting improvement of record quality. A still further advantage is that the detectors are not restrained under the extreme tension of the cable as they are in the conventional bottom type cable and, therefore, there is less chance of propagation of shock waves up and down the length of the cable with resultant interference in reflections.

For a further description of the invention, reference will now be made to the figures of the accompanying drawing.

Figure 1 indicates schematically, and in part, the semi-floating conductor cable with a plurality of detectors connected thereto.

Figure 2 indicates in more detail an individual cable buoy.

2

Figure 3 indicates in more detail an individual detector buoy.

In Figure 1, the numeral 10 designates a body of water while the numeral 11 designates the surface of the submerged area. Numeral 12 designates a multiple detector marine cable equipped with the necessary electrical conductors. The cable 12 leads to a winding drum or reel 13 mounted on a boat 14.

The composite cable 12 is supported by a plurality of buoys 15a, 15b, 15c, 15d, etc., spaced a suitable distance apart along the length of the cable. For example, the distance between each two buoys may be 100 feet although the spacing may vary from this, as desired, being either less or greater. Also the cable may be as much as 700 or 800 feet in length.

Connected to the bottom of each cable buoy is a length of chain 16, for example, a 3-foot length of ½ inch iron chain. As indicated, the free end of the chain is adapted to drag on the submerged surface.

A stabilizing chain 18 is connected to the tail end of the cable 12 so as to drag on the submerged surface and thus maintain sufficient tension on the cable to hold it in a straight line. It is contemplated that other stabilizing means may be employed. Thus when heavy currents of water exist, it may be advantageous to use a boat or other device.

As indicated in Figure 1, a plurality of detectors or seismometer buoys 20a, 20b, 20c, 20d, etc., are connected by relatively short leads 21a, 21b, 21c, 21d, etc., to the semi-floating cable 12. Detectors 22a, 22b, 22c, 22d, etc., are rigidly attached to each of these buoys. These detectors may be similar to that described in U. S. Patent No. 2,130,213, granted to Wolf, Cowles and Richardson, September 13, 1938, although other types of geophones may be used.

Each detector is in electrical communication through a conductor in its respective lead with a conductor in, or associated with, the cable 12.

When a seismic or acoustic disturbance is created in the under-water surface of the earth, such as by the firing of a shot by a shot boat, not indicated in the drawing, the seismic wave travels outwardly through the earth's substance. When the sound wave reaches a hard stratum in the earth's substance, a portion of the wave energy is reflected with rays passing to each detector. Each detector converts the wave energy received by it into electrical energy, as is well known and has been described, for example, in the foregoing patent.

The electrical energy produced in each detector is transmitted through the electrical conductors in the aforementioned leads and in the cable 12 to suitable receiving and recording mechanisms located on the boat 14.

The detector leads are uniformly spaced along the cable 12 and this spacing between leads may be 25 feet, for example, although it will be understood that any number of detectors with any desired spacing between the detectors may be employed.

As indicated in Figure 2, the cable 12 may comprise a steel cord or cable 25, ¼ inch in diameter, extending through a tube 26, which in turn extends axially through the cylindrical buoy 15. The buoy is locked in position on the steel cable 25 by means of cable clamps 27 and 28. The insulated electrical conductor component 29 of the composite cable 12 extends along the exterior of the buoy 15 and is rigidly fastened or clamped to the sections of the steel cable 25 between buoys 15a, 15b, 15c, 15d, etc., by suitable means well known in the art. The buoy 15 may have a volumetric capacity, for example, of about 500 cubic inches and may be filled with any suitable gas, such as air or nitrogen, etc.

As indicated in Figure 3, each detector buoy 20 is connected by a steel cable 30, for example, about 9/64 inch in diameter, to the composite cable 12. Each detector 22 is clamped or otherwise rigidly held in supporting bracket 31 attached or welded to the lower or trailing end of its respective buoy 20. An insulated conductor 32 attached to the cable 30 provides a means of electrical communication between the detector 22 and the electrical conductor component 29 of Figure 2.

Advantageously, the bracket 31 is provided with a fin or vane 33. While a single fin is shown, nevertheless several fins or vanes may be provided in any suitable geometrical arrangement such that the buoy 20 will assume an oblique position during movement of the cable 12 through the water, such as when being towed by the boat 14. The purpose of the fins or vanes is to prevent the detector buoys from diving and wrapping around the cable 12 during such towing.

Each detector buoy 20 may have a volumetric capacity of about 280 cubic inches, for example. Each buoy 20 may be entirely filled with gas such as air or nitrogen. Advantageously, however, these buoys may be partially filled with a hydrocarbon oil, such as gas oil or kerosene. This oil serves to adjust the buoyancy of the unit and also serves as a medium for suppressing natural resonance of the buoy. Thus in the absence of a fluid inside the detector, a substantial amount of high frequency noise may appear on the seismic records.

In actual operation the buoyancy of the cable system is adjusted so that all portions of the cable 12, to which detectors are connected, are maintained at a depth of about 1½ feet, approximately, above the surface of the submerged area by means of the weighting chains. Thus with the cable system specifically described above, the chains 16 will be about 3 feet in length and weigh about 5 pounds per foot. The leads connecting the detector buoys may be approximately 3.5 feet in length so that the detector buoys are maintained approximately 5 feet above the surface of the submerged area but below the surface of the water. It will be realized, of course, that these distances can be varied, if desired, so long as the cable 12 is maintained in a semi-floating condition at all points and thus does not drag on the submerged surface. It is advantageous to keep the detectors submerged a substantial distance below the surface of the water. In this way movement of the detectors as a result of surface movement of the water is avoided or reduced to a minimum.

It will be understood that the cable system is maintained at rest during shooting. After each shot has been recorded, the cable can be towed to the next location for recording of the next shot.

Obviously many modifications and variations of the invention, as hereinbefore set forth, may be made without departing from the spirit and scope thereof, but only such limitations should be imposed as are indicated in the appended claims.

I claim:

1. A seismic surveying system for submerged areas including a marine cable adapted to be towed through the submerging medium, buoys spaced apart from each other and attached to said cable, a weighting chain for each buoy attached by one end thereto with the free end of the chain adapted to drag upon the surface of the submerged area, and seismic detectors each supported in a submerged carrier, said carriers being connected by non-rigid means to said cable and spaced apart along the cable, each detector being in electrical communication with an electrical conductor in association with said cable, the relative weight of the said chains and buoyancy of the combined cable and buoys being such that the upward force of the buoyancy of the combined cable and buoys is greater than zero but less than the downward force of the entire weight of the chains, so that the whole assembly will stabilize at a level where the supporting of a portion of each chain by the ground surface leaves in balance the opposing upward force of the buoyancy and downward force of the unsupported portion of the chains.

2. A seismic surveying system for submerged areas including a marine cable adapted to be towed through the submerging medium, buoys spaced apart from each other and attached to said cable, a weighting chain for each buoy attached by one end thereto with the free end of the chain adapted to drag upon the surface of the submerged area, detector buoys non-rigidly connected to said cable and spaced apart along the cable, and a seismic detector supported by each detector buoy, each detector being in electrical communication with an electrical conductor in association with said cable, the relative weight of the said chains and buoyancy of the combined cable and buoys being such that the upward force of the buoyancy of the combined cable and buoys is greater than zero but less than the downward force of the entire weight of the chains, so that the whole assembly will stabilize at a level where the supporting of a portion of each chain by the ground surface leaves in balance the opposing upward force of the buoyancy and downward force of the unsupported portion of the chains.

3. A seismic surveying system for submerged areas including a conductor cable adapted to be towed through the submerging medium, buoys spaced apart from each other and attached to said cable, a weighting chain for each buoy attached by one end thereto with the free end of the chain adapted to drag upon the submerged surface, detector buoys non-rigidly connected to said cable and spaced apart along the cable and a seismic detector supported by each detector buoy, each detector being in electrical communication with said conductor cable, the relative weight of the said chains and buoyancy of the combined cable and buoys being such that the upward force of the buoyancy of the combined cable and buoys is greater than zero but less than the downward force of the entire weight of the chains, so that the whole assembly will stabilize at a level where the supporting of a portion of each chain by the ground surface leaves in balance the opposing upward force of the buoyancy and downward force of the unsupported portion of the chains.

4. A seismic surveying system for submerged areas wherein a conductor cable having a plurality of seismic detectors in electrical communication therewith is maintained submerged at a predetermined level above the surface of the submerged area, the combination comprising a conductor cable, a plurality of cable supporting buoys each spaced apart along the length of the cable and attached thereto, a weighting chain for each buoy having one end attached thereto while the other end of the chain is free to drag upon the submerged surface, and a plurality of detector buoys non-rigidly connected to said cable and spaced apart along the cable, the relative weight of the said chains and buoyancy of the combined cable and buoys being such that the upward force of the buoyancy of the combined cable and buoys is greater than zero but less than the downward force of the entire weight of the chains, so that the whole assembly will stabilize at a level where the supporting of a portion of each chain by the ground surface leaves in balance the opposing upward force of the buoyancy and downward force of the unsupported portion of the chains.

ROY LEE GALLAWAY.

REFERENCES CITED

The following references are of record in the file of this patent:

UNITED STATES PATENTS

| Number | Name | Date |
|---|---|---|
| 2,203,894 | Cooke | June 11, 1940 |
| 2,241,428 | Silverman | May 13, 1941 |

FOREIGN PATENTS

| Number | Country | Date |
|---|---|---|
| 3,654 | Great Britain | of 1884 |